US011588680B2

(12) United States Patent
Padmanabhan et al.

(10) Patent No.: US 11,588,680 B2
(45) Date of Patent: *Feb. 21, 2023

(54) SYSTEM AND METHOD OF DATA COMMUNICATION

(71) Applicant: Meta Platforms, Inc., Menlo Park, CA (US)

(72) Inventors: Amar Padmanabhan, Menlo Park, CA (US); Praveen Kumar Ramakrishnan, San Carlos, CA (US); Shaddi Husein Hasan, Blacksburg, VA (US); Anoop Singh Tomar, Santa Clara, CA (US); Evgeniy Makeev, Belmont, CA (US); Omar Ramadan, Berkeley, CA (US); Jiannan Ouyang, Palo Alto, CA (US); Xiaochen Tian, San Mateo, CA (US); Thomas Romano, San Francisco, CA (US); Ting Xia, Vancouver (CA); Jagannath Rallapalli, San Jose, CA (US); Kuan-Yu Li, Mountain View, CA (US); Shruti Sanadhya, Sunnyvale, CA (US)

(73) Assignee: Meta Platforms, Inc., Menlo Park, CA (US)

( * ) Notice: Subject to any disclaimer, the term of this patent is extended or adjusted under 35 U.S.C. 154(b) by 186 days.

This patent is subject to a terminal disclaimer.

(21) Appl. No.: 17/177,084

(22) Filed: Feb. 16, 2021

(65) Prior Publication Data

US 2021/0168026 A1 Jun. 3, 2021

Related U.S. Application Data

(63) Continuation of application No. 16/865,196, filed on May 1, 2020, now Pat. No. 10,958,510, which is a
(Continued)

(51) Int. Cl.
*H04L 12/24* (2006.01)
*H04L 41/08* (2022.01)
(Continued)

(52) U.S. Cl.
CPC .......... *H04L 41/08* (2013.01); *H04L 12/4633* (2013.01); *H04L 67/1097* (2013.01)

(58) Field of Classification Search
CPC .. H04L 41/08; H04L 12/4633; H04L 67/1097
See application file for complete search history.

(56) References Cited

U.S. PATENT DOCUMENTS 6,434,664 B1 * 8/2002 Buch ..................... G06F 3/0611
711/112
7,324,555 B1 * 1/2008 Chen .................. H04N 7/17336
348/E5.008

(Continued)

*Primary Examiner* — Arvin Eskandarnia
(74) *Attorney, Agent, or Firm* — Baker Botts L.L.P.

(57) ABSTRACT

Particular embodiments may receive a request to perform a task to a core network by a user device via an access point. The user device may be authenticated by the core network which comprises one or more network functionality components, and each of the one or more network functionality components may be decomposed into multiple service types. The core network may identify service instances for deployment based on the task. Each of the service instances may belong to one of the multiple decomposed service types. The service instances may be deployed to one or more server machines to accomplish the task by the core network based on resource requirements of the service instances and current resource availability of the one or more server machines.

20 Claims, 6 Drawing Sheets

Related U.S. Application Data continuation of application No. 16/237,328, filed on Dec. 31, 2018, now Pat. No. 10,708,124.

(51) Int. Cl.
*H04L 12/46* (2006.01)
*H04L 67/1097* (2022.01)

(56) References Cited

U.S. PATENT DOCUMENTS

| | | | |
|---|---|---|---|
| 7,797,064 B2* | 9/2010 | Loomis | G11B 20/10 |
| | | | 700/94 |
| 2004/0138948 A1* | 7/2004 | Loomis | G11B 20/10 |
| | | | 700/94 |
| 2006/0206635 A1* | 9/2006 | Alexander | G06F 13/28 |
| | | | 710/22 |
| 2007/0121526 A1* | 5/2007 | Sung | H04L 65/4061 |
| | | | 370/252 |
| 2009/0183216 A1* | 7/2009 | Crosby | H04H 60/04 |
| | | | 725/105 |
| 2009/0288104 A1* | 11/2009 | Bagepalli | H04L 63/10 |
| | | | 719/328 |
| 2009/0313300 A1* | 12/2009 | Dettori | G06F 9/542 |
| 2012/0173754 A1* | 7/2012 | Dalrymple | H04L 65/1096 |
| | | | 709/231 |
| 2019/0280979 A1* | 9/2019 | Jain | G06F 9/45558 |

\* cited by examiner

SYSTEM AND METHOD OF DATA COMMUNICATION

PRIORITY

This application is a continuation under 35 U.S.C. § 120 of U.S. patent application Ser. No. 16/865,196, filed 1 May 2020, which is a continuation under 35 U.S.C. § 120 of U.S. patent application Ser. No. 16/237,328, filed 31 Dec. 2018, each of which is incorporated herein by reference.

TECHNICAL FIELD

This disclosure generally relates to network architecture, and in particular to systems and methods for a core network architecture.

BACKGROUND

Mobile data communications are growing quickly because of global communication networks and devices such as the internet, intranets, mobile computing devices, and increased requirements of workforce mobility. A mobile computing device, such as a smartphone, tablet computer, or laptop computer, may include functionality for wireless communication, such as BLUETOOTH communication, near-field communication (NFC), infrared (IR) communication, communication with a wireless local area networks (WLANs), or cellular-telephone network.

Data communication networks including but not limited to generations of wireless or mobile data communication networks may provide a comprehensive and secure network communication solution with much faster data speeds than a previous generation thereof. The traffic demand in a core mobile data network has increased dramatically in the past few years and is expected to grow even faster. A core network is the core part of the data communication network, which offers numerous services to the users who are interconnected by accessing the network. The core network delivers routes to exchange information among various sub-networks. When it comes to enterprise networks that serve a single organization, the term backbone is often used instead of core network, whereas when used with service providers the term core network is prominent. To extend the mobile data communication and to meet the incremental data rates and capacity demands, network infrastructures are expanded rapidly and globally.

SUMMARY OF PARTICULAR EMBODIMENTS

To provide quality internet service to unconnected residences around the globe, network infrastructures are required to build globally for establishing mobile data communications connecting the residences. The network infrastructures may comprise hardware and software resources that enable network connectivity, communication, operations and management of an enterprise or public network. The network infrastructures may provide the communication path and services between users, processes, applications, services, and external networks (e.g., social networking system). As the internet access grows rapidly, high aggregated user data-rates may be required for large volumes of data communication on the network, such as a wired, wireless, or satellite network. The network infrastructures with respective capacities may be implemented to meet the demand of large volumes of data communication on the network. However, such fixed capacity infrastructures may not be flexible to handle the rapidly changed data volumes. For example, while the capacity of the infrastructure may be fully utilized for the peak load, it may be wasted when the network load is light. Further, the fixed capacity infrastructures may not be optimized with respect to the network update easily (e.g., it may comprise functionalities that are not necessary for the current network or may not comprise functionalities that are needed for the current network.)

The embodiments described herein provide a system and a method of a data communication architecture that enables flexible and scalable service deployments of a network, such as a wired, wireless, or satellite network. Specifically, the data communication architecture is service-oriented architecture and directed to services deployment of a core network, especially in a sparsely populated area. The network capacity may be easily adjusted (e.g., scaled up or scaled down) with respect to the network load changes. Furthermore, introducing new functionalities (e.g., specific functionalities for specific providers or applications) may be accomplished with minimum efforts or cost. Thus, the service-oriented network architecture may be introduced to achieve those goals.

In particular embodiments, functionalities of network entities of the network may be decomposed into a plurality of atomic services. Each of the plurality of atomic service may be implemented as a service module running on one of a plurality of servers of the network. To provide connectivity to a user or users, the network can coordinate a series of services in specific sequences to construct one or more service pipelines, wherein the services in the pipelines may be mixed service types of different network entity functionalities. User plane messages as well as control plane signals may flow through corresponding constructed service pipelines (e.g., message pipelines or control pipelines). Physical deployment of the services in the pipelines may depend on various factors including resource requirements of the services or availability of the resources of the network with respect to configurations of the services. For example, multiple services may be deployed on a single server if the multiple services do not consume much computing resources, whereas only one service may be deployed exclusively on a server if the service consumes high resources (e.g., a heavy computation service).

In particular embodiments, the physical deployment of the services in the pipelines may be flexible with respect to the decomposed functionality services of the network entities. For example, a network entity may comprise a plurality of functionality services supporting multiple network policies. However, if not all of the multiple network policies are implemented in the current given network, then not all of the functionality services are needed for the current network. The network may only need to include the functionality services necessary for the current network and exclude the unnecessary services. In case a new functionality of the network entity is developed, or a functionality of the network needs to be updated, the new or updating services can be quickly and conveniently added into the network.

In particular embodiments, the physical deployment of the services in the pipelines may be scalable with respect to the network load. The system may manage the capacity of the network by network dimensioning for the capacity. More services can be added to the network when the network traffic volume is high, and less services may be needed when the network traffic volume is low. For example, when more downlink data packets need to be processed, the network may add one or more decomposed packet services needed for increased downlink data, instead of the entire packet entity. The services may be deployed to one or more server machines of the network, such that more server machines may be needed when the network load is high and less server machines may be needed when the network load is low. Additionally, the services run on the different server machines can be consolidated when the service instances are changed. For example, during the peak load period, the service pipelines may have more service instances to be processed, and the system may automatically scale up the network capacity by adding one or more service instances. During the low network traffic period (e.g., midnight), the service pipelines may have less services to be deployed, and the system may automatically scale down the network capacity by removing one or more service instances. The server machines that process the service instances may be reconfigured and the service instances may be reconsolidated, such that the number of participating server machines may be increased or decreased, and the services on the server machines may be relocated.

The embodiments disclosed herein are only examples, and the scope of this disclosure is not limited to them. Particular embodiments may include all, some, or none of the components, elements, features, functions, operations, or steps of the embodiments disclosed herein. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

The embodiments described herein provide a system and a method of data communication on a network, such as a wired, wireless, or satellite network. The system and method may use a service-oriented architecture which is a network framework of core network including non-wireless and wireless core network for providing converged voice and data on various networks. For example, the various networks may include wired data communication services, satellite data communication, or different generations of wireless services (e.g., second generation (2G), third generation (3G), fourth generation (4G), or fifth generation (5G)) with various standards (e.g., Long-Term Evolution (LTE) or LTE Advanced) based on various technologies (e.g., Global System for Mobile (GSM) or Code Division Multiple Access (CDMA)). The core network may support packet-switched traffic, and the interfaces of the core network are based on Internet Protocols (IPs) such that all services can be delivered through packet connections (e.g., data, voice, media, etc.). Mobile operators or mobile network providers can employ a packet network for all services by utilizing the core network to deploy the data communication architecture. The service-oriented architecture may unify voice and data on an Internet Protocol (IP) service architecture such that the voice is treated as just another IP application. This allows operators to deploy and operate one packet network for all generations of wireless network including 2G, 3G, wireless local area network (WLAN) and LTE 4G, and fixed access including Ethernet, Digital Subscriber Line (DSL), cable and fiber optic.

Various challenges are faced in designing a packet core network. Some of these challenges include, managing the evolution of the packet core without impact to existing data services, considering the need to separate user plane traffic and control traffic, migration from a centralized deployed architecture (e.g., network entity oriented) to a more distributed architecture (e.g., service oriented). In addition, deployment of core network may encounter increased cost and management complexity.

Figure 1:
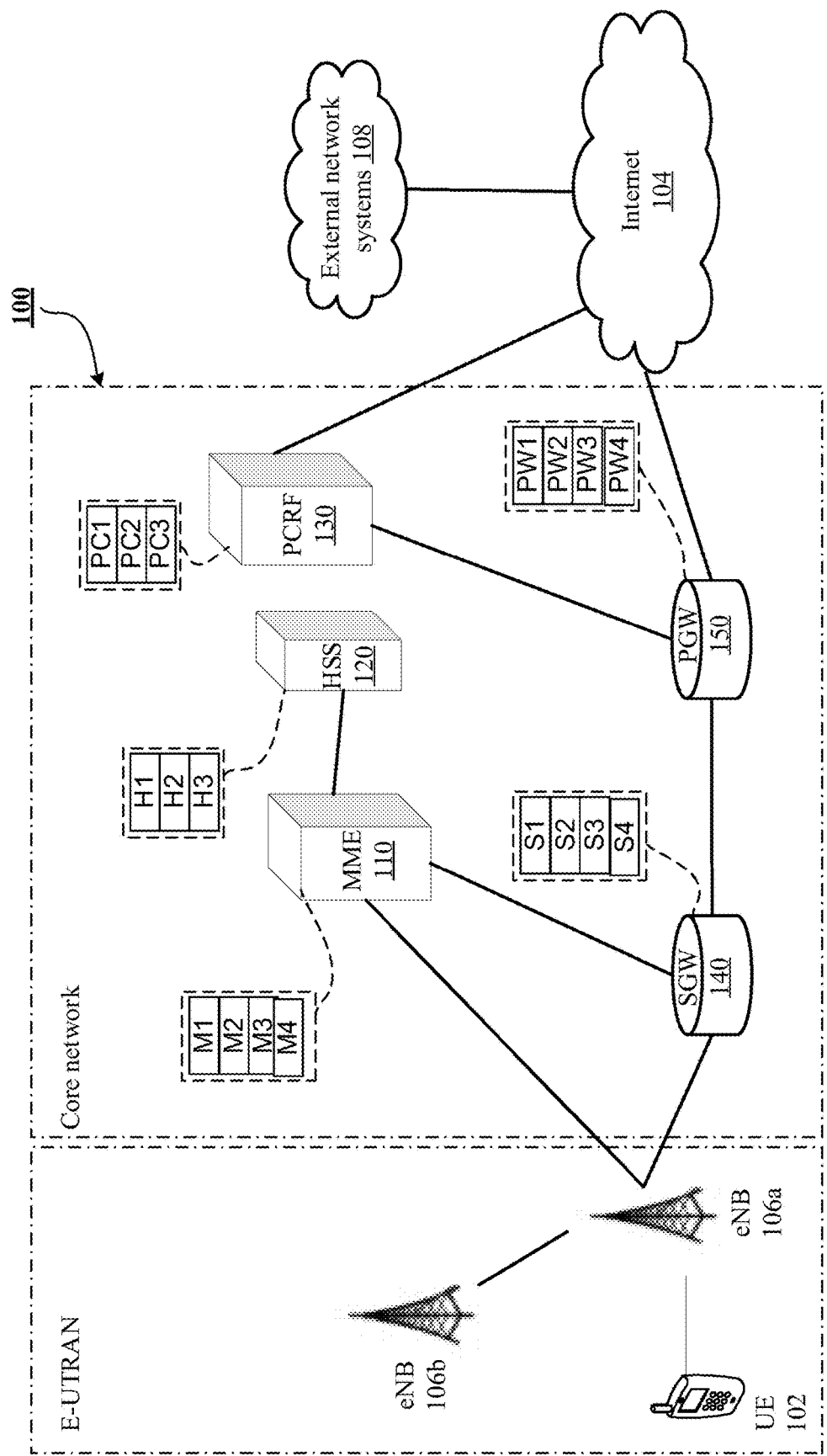
FIG. 1 illustrates an example network environment in accordance with particular embodiments.

FIG. 1 illustrates an example network environment in accordance with particular embodiments. The network includes a core network 100 which is a wireless core network architecture comprising a plurality of network entities, wherein the functionality of each of the network entities may comprise a plurality of atomic services. In particular embodiments, the functionality of each network entity can be broken down into a plurality of services which may be further broken down into sub-services.

A user equipment (UE) or a user device 102 may attach to a core network (e.g., core network 100) via one of a plurality of network towers (e.g., access points (APs) including AP 106a and AP 106b). Through the core network, the user device 102 can access an internet 104, and further to various external network systems 108 (e.g., FACEBOOK, HULU, or YOUTUBE). The user device 102 can be a hand-held mobile device, a laptop computer equipped with a mobile broadband adapter, or any other device used directly by an end-user to communicate via the wireless network. The network can be any of the wireless communication technologies like GSM, CDMA, WLAN, WI-FI, Worldwide Interoperability for Microwave Access (WiMAX) or other wide area network (WAN) technologies. The user device 102 may connect to the AP 106a or AP 106b, which may be a base transceiver station (BTS) in GSM networks or evolved node B (eNodeB or eNB) in LTE networks. The LTE is a standard for 4G wireless broadband technology that offers increased network capacity and speed to mobile device users. The BTS or eNodeB is a piece of equipment that facilitates wireless communication between the user device 102 and the core network.

In particular embodiments, the functionalities of the network entities may be broken down into the plurality of atomic services based on the network entities, and the corresponding service instances can be deployed to one of a plurality of server machines of the network. For example, a typical legacy core network, such as the core network 100 may comprise a plurality of functionality entities including, without limitation, a Mobility Management Entity (MME) 110, a Home Subscriber Server (HSS) 120, a Policy and Charging Rules Function (PCRF) 130, a Service Gateway (SGW) 150, a Packet Gateway (PGW) 160, and/or any other network entities. The MME 110 may be a control entity only, while the SGW 140 and PGW 150 can be a combination of control and data entity. Typically, in the network entity oriented architecture, the atomic services may reside in the corresponding network entity and be deployed. In particular embodiments, in the service-oriented architecture, the services may reside in one of server machines in a computing center (e.g., Cloud computing center or a local computation device) of the network and be scheduled to be deployed.

For example, the functionality of the MME 110 may be decomposed to a plurality of atomic services (e.g., M1, M2, M3, M4, etc.), wherein the atomic service is the smallest functionality unit which can be individually deployed and executed on the server machines. The HSS 120 may comprise a plurality of atomic services (e.g., H1, H2, H3, etc.), the PCRF 130 may comprise a plurality of atomic services (e.g., PC1, PC2, PC3, etc.), the SGW 140 may comprise a plurality of atomic services (e.g., S1, S2, S3, S4, etc.), and the PGW 150 may comprise a plurality of atomic services (e.g., PW1, PW2, PW3, PW4, etc.) In the service-oriented architecture, the services M1-M4 may reside in one of server machines, the services H1-H3 and PC1-PC3 may reside in a second server machine, the services S1-S4 may reside in a third server machine, and the services PW1-PW4 may reside in a fourth server machine in a computing center (e.g., Cloud computing center) of the network and be scheduled to be deployed.

To provide connectivity to the user device 102, the system can coordinate a series of service instances to accomplish one or more tasks associated with the user device 102, wherein the series of service instances can be of different network entity functionalities in a specific sequence. For example, a user may use the user device 102 (e.g., a smart phone) for a task T1 (e.g., sending a video to a social network via the internet). The task T1 may comprise a sequence of service instances of M1-H1-M3-S1-PW2 of the respective network entities of the MME 110, HSS 120, SGW 140, and PGW 150. The system can coordinate the deployment of the service instances in the specific sequence for accomplishing the task T1. For example, the service M1 of the MME 110 may be deployed followed by, the service H1 of the HSS120, the service M3 of the MME 110, the service S1 of the SGW 140, and the service PW2 of the PGW 150. The number, sequence, or types of the service instances for accomplishing the respective tasks may be various with respect to the tasks. The coordination and the deployment of the series of service instances may be network entity oriented, such that the system may determine which network entity may deploy the next phase service. In particular embodiments, the coordination and the deployment of the series of service instances may be service-oriented, such that the system may determine which service is the next phase service and deploy the determined next phase service.

Since the functionality of each network entity may be pre-determined, the number and types of atomic services of each network entity may be pre-fixed with respect to the functionality of the network entity. In the event that a new service needs to be added or an existing service needs to be replaced, the hardware and software of the corresponding network entity may need to be updated for the addition or replacement service. In particular embodiments, the service-oriented architecture may enable the system to add a new service or to replace an existing service easily and conveniently.

Further, expansion of the network for increasing network capacity typically can be achieved by replication of one or more network entities in the network entity oriented architecture. The replication may include all the atomic services of the network entities, even though some of the atomic services may not be necessary for the current network. For example, the local provider or operator would like to expand the network capacity for serving a large volume of phone calls. An additional network entity of MME may be necessary to manage the increased network traffic. Although the operator determines that only services M1, M2, and M3 of the MME 110 are necessary for the expansion, the replication of the MME 110 may also include the service M4 in the network entity oriented architecture.

In particular embodiments, the replication may include only the necessary atomic services of the network entities in the service-oriented architecture. As stated in the above example, the local provider or operator would like to expand the network capacity for serving the incremental number of subscribers. Instead of replicating all the services of the MME 110, only the services M1, M2, and M3 may be replicated, but the un-needed service M4 may not be included in the replication. The elimination of unnecessary services in the service-oriented architecture may result in an optimized network system. Vice versa, the network capacity can be downsized easily by removing one or more services of the network entities. Using this mechanism, the service-oriented architecture can be flexible for adding or removing the services and can be scalable for increasing or decreasing the network capacity.

Figure 2:
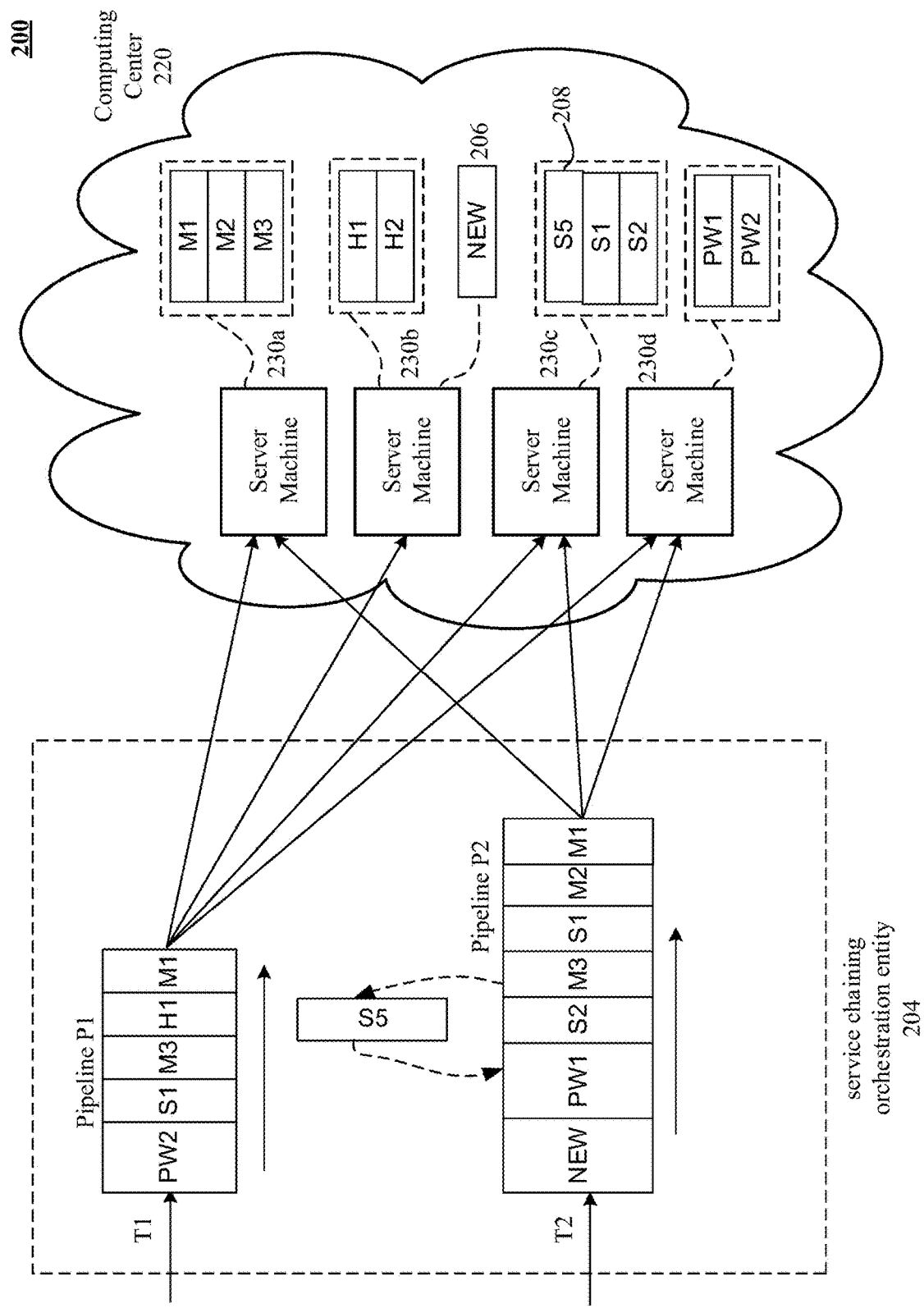
FIG. 2 illustrates an example diagram of a service-oriented network environment in accordance with particular embodiments.

FIG. 2 illustrates an example diagram of a service-oriented network environment in accordance with particular embodiments.

A service-oriented network architecture 200 is a wireless core network architecture, in which the functionalities of network entities may be decomposed into a plurality of atomic services with respect to the services instead of network entities. The service-oriented network architecture 200 may comprise a service chaining orchestration entity 204 and a plurality of decomposed services, wherein the plurality of decomposed services may include services M1, M2, and M3 which are a subset of decomposed functionality of the MME 110 of FIG. 1, services H1 and H2 which are a subset of decomposed functionality of the HSS 120 of FIG. 1, services S1 and S2 which are a subset of the decomposed functionality of the SGW 140 of FIG. 1, and services PW1 and PW2 which are a subset of decomposed functionality of the PGW 150 of FIG. 1. Optionally, the service-oriented architecture 200 may include a new service 206, or a replacement service 208 which may replace or update an existing service (e.g., the service S1 may be replaced by the service S3). The plurality of the service instances may reside in one or more of server machines of a computing center 220. The plurality of service instances may be distributed to the one or more server machines with respect to the required resources of the services, such that the M1-M3 consumes light computation and can be deployed on server machines 230a, the H1-H2 can be deployed on server machines 230b, the S1-S2 can be deployed on server machines 230c, and the PW1-PW2 can be deployed on server machines 230d.

In particular embodiments, the functionalities of network entities in the service-oriented network architecture 200 may be decomposed into a plurality of services, which may be a mix and match of functionalities of different network entities. For example, even though the service M4 of FIG. 1 is a MME service, it may not be included in the service-oriented network architecture 200 when it is unnecessary for the current network operation. The service instances run on the server machine 230b may be a mix and match of functionalities of the HSS 120 and NEW. Therefore, the service-oriented network architecture 200 may be an optimized architecture that comprises only the necessary decomposed atomic services to operate the current network, and the deployment of the services can be optimized and consolidated on the server machines.

In particular embodiments, each of the plurality of decomposed atomic services may be deployed to and run on one of a plurality of server machines of the network. For example, the service-oriented network architecture 200 may comprise the services M1, M2, M3, H1, H2, S1, S2, PW1, and PW2, which may be configured by the service chaining orchestration entity 204. A series of the service instances can be scheduled in a specific sequence in a pipeline to accomplish a specific task. The service chaining orchestration entity 204 may configure each of the services with the operation related information, including a next phase service type and the operation conditions associated thereto. The coordination of the series of service instances may be performed at the service level, such that the service chaining orchestration entity 204 may determine which service is for the next phase, wherein the determined service may be deployed to a computing center (e.g., the computing center 220). In particular embodiments, the services may be deployed to a local computation device or to a virtual computation center.

The MME may be the key control-node for the network (e.g., the LTE network). The MME is responsible for idle mode UE (User Equipment) paging and tagging procedures including retransmissions and the bearer activation/deactivation process. The MME may be also responsible for choosing a SGW service for the UE at the initial attach and at time of intra-LTE handover involving Core Network (CN) node relocation. The MME may be responsible for authenticating the user by interacting with the Home Subscriber Service (HSS) and for generation and allocation of temporary identities to the UEs. The MME checks and enforces the authorization of the UE. The MME is the termination point in the network for ciphering/integrity protection for Non Access Stratum (NAS) signaling and handles the security key management, and the lawful interception of signaling is also supported by the MME. The MME also provides the control plane function for mobility between generations of networks with the respective interface terminating at the MME from the Serving GPRS Support Node (SGSN), wherein GPRS is General Packet Radio Service.

The HSS is a central database that contains user-related and subscription-related information. The functions of the HSS may include functionalities such as mobility management, call and session establishment support, user authentication and access authorization.

The SGW functions may include routing and forwarding user data packets, while also acts as the mobility anchor for the user plane during inter-eNodeB handovers and as the anchor for mobility between LTE and other generations of technologies (e.g., terminating S4 interface and relaying the traffic between 2G/3G systems and PGW). For IDLE mode UEs, the SGW terminates the downlink data path and triggers paging when downlink data arrives for the UE. The SGW manages and stores UE contexts (e.g., parameters of the IP bearer service, network internal routing information), and performs replication of the user traffic in case of lawful interception.

The PGW is a critical network function for the core network. The PGW acts as the interface between the LTE network and other packet data networks, such as the internet or IP Multimedia Subsystem (IMS) networks, by providing connectivity from the UE to external packet data networks and being the point of exit and entry of network traffic for the UE. The PGW may serve as an anchor point for network mobility between different generations of technology, act as the Policy and Charging Enforcement Function (PCEF), manage quality of service (QoS), or provide deep-packet inspection and lawful intercept. In particular embodiments, the PGW may simplify the network by acting as a standalone element, or it may be integrated with other network elements such as MME or SGW. The UE may have simultaneous connectivity with more than one PGW for accessing multiple Packet Data Networks (PDNs). In particular embodiments, the PGW may comprise services such as a phasing function.

In particular embodiments, in order to provide connectivity to the user device 102 of FIG. 1, the system can schedule a series of service instances to accomplish one or more tasks associated with the user device 102, wherein the series of service instances can be of different types of services in a specific sequence. As described previously, a user may use the user device 102 (e.g., a smart phone) for a task T1 (e.g., sending a video to a social network via the internet). The task T1 may comprise a sequence of service instances of M1-H1-M3-S1-PW2. The service chaining orchestration entity 204 can schedule the deployment of the service instances for accomplishing the task T1. For example, the service chaining orchestration entity 204 may first deploy the service M1 followed by the service H1, the service M3, the service S1, and the service PW2 to respective server machines in the computing center 220. The number, sequence, or types of the service instances for accomplishing the respective tasks may be various with respect to the nature of the tasks. The coordination of the series of service instances may be performed at the service level, such that the service chaining orchestration entity 204 may determine which service is for the next phase, wherein the determined service may be deployed to the respective server machines.

In particular embodiments, multiple tasks can be launched simultaneously to the network. For example, another task T2 (e.g., watching movies on HULU) may comprise a series of services of M1-M2-S1-M3-S2-PW1, and/or other services including transcoding, caching, etc. The service chaining orchestration entity 204 can schedule the deployment of the service instances in the specific sequence for accomplishing the task T2. For example, the service chaining orchestration entity 204 may deploy the service M1 followed by the service M2, the service S1, the service M3, the service S2, and the service PW1 to the server machines in the computing center 220. The service instances for the multiple tasks (e.g., the tasks T1 and T2) may be scheduled in respective pipelines (e.g., the pipeline P1 or P2) and be deployed by the service chaining orchestration entity 204 when the service instances are ready. The service chaining orchestration entity 204 may determine when the service instances are deployed and which server machine or machines that the service instances are deployed to, based on the configurations of the services and hashing of the encapsulation header field information. In particular embodiments, functions for operating the system may be scheduled in a control pipeline, while the service instances may be schedule in message pipelines for accomplishing the user tasks.

The service instances for the respective tasks may be scheduled into specific sequences to construct one or more message pipelines by the service chaining orchestration entity 204. The series of service instances in the pipelines may be mixed and match of decomposed services of different functionalities of network entities. Each of the decomposed services may be configured by the service chaining orchestration entity 204, and the configuration of each decomposed services may include the type of service in the next phase. For example, the configuration of the service M3 may indicate that the next phase service is the service S2 in the pipeline P1. The configurations of the services may also include other information for the service chaining orchestration entity 204 to determine which service is the next phase service to deploy.

Alternatively, the configurations of the services may include a list of next phase service types and corresponding conditions thereof for forwarding a message. In the above example, the service M1 may have a list of next phase services (e.g., the service H1 or service M2). The service chaining orchestration entity 204 may determine which service is the next phase service based on the conditions of the next phase services, such that the next phase service may be the service H1 under the condition for the task T1, while it may be the service M2 under the condition for the task T2. For example, a packet classification service may determine a packet type, and the next phase service type may be determined with respect to the determined packet type. When the packet classification service determines that the packet type is not a zero-rating class, the packet classification service may forward the packet to a packet metering service. However, if the packet classification service determines that the packet belongs to a zero-rating class, the packet classification service may skip the packet metering service and forward the packet to another service. In this example, the configuration of the packet classification service may comprise a list of next phase service types (e.g., a packet metering service and other services) and the conditions thereof (e.g., the zero-rating class or non-zero-rating class).

The configurations of the services may be initially programed with respect to the respective task and subsequently be updated by the service chaining orchestration entity 204 when there is a new service being added or an existing service being replaced.

In particular embodiments, messages in the message or service pipeline P1 may be encapsulated by an encapsulation protocol (e.g., Generic routing encapsulation (GRE), Internet Protocol Security (IPsec), Virtual Extensible LAN (VXLAN), etc.), wherein the encapsulation protocol has an encapsulation header with one or more fields. When a current phase service is finished on a message, the service chaining orchestration entity 204 may determine the next phase service type based on the configurations of the current phase service. If there are multiple service instances with respect to the determined next phase service type, the system may hash one or more values of encapsulation header fields of the messages. For example, the encapsulation header has an International Mobile Subscriber Identity (IMSI) field that identifies subscribers of the network. The service chaining orchestration entity 204 may determine the next phase service instance that handles the identified subscribers by hashing the IMSI value from the encapsulation header. For another example, there may be multiple policy enforcing service instances in the network, wherein each policy enforcing instance may handle different traffic class. After the packet classification service classifies a packet type, the packet classification service may fill a packet class field in the encapsulation header with respect to the identified packet type. Hashing the packet type value in the encapsulation header may determine the corresponding policy enforcing service instance for the said packet. Notably, each service may be agnostic to the functionalities of the other services in the service pipeline.

In particular embodiments, the protocol architecture of the network (e.g., LTE network) may be divided into a user plane protocol and a control plane protocol. At the user plane side, data packets may be created and processed by the user plane protocols (e.g., Transmission Control Protocol (TCP), User Datagram Protocol (UDP), or IP), while in the control plane, the signaling messages may be written and exchanged between the base stations and the mobile devices by the control plane protocol. The user plane protocol stack between the eNodeB and UE may comprise one or more sublayers, wherein the sublayers may include a Packet Data Convergence Protocol (PDCP) layer, a radio Link Control (RLC) layer, and a Medium Access Control (MAC) layer. On the user plane, packets in the core network may be encapsulated in a specific network protocol and tunneled between the PGW and the eNodeB. Different tunneling protocols may be used with respect to the interfaces, such that a S1 interface may be used between the eNodeB and SGW or MME and a S5/S8 interface may be used between the SGW and PGW.

The control plane may include additional control layer which is responsible for configuring the lower layers (e.g., a physical layer). The control plane may handle radio-specific functionality based on the state of the UE, wherein the state of the UE includes idle mode or connected mode. In the idle mode, the UE may camp on a cell after a cell selection or reselection process, and the control plane protocols may include cell selection and reselection procedures. The UE may also monitor a paging channel to detect incoming calls and acquire system information. In the connected mode, the UE may supply the Evolved Universal Terrestrial Radio Access Network (E-UTRAN) with downlink channel quality and neighbor cell information to enable the E-UTRAN to select the most suitable cell for the UE.

In particular embodiments, user plane messages as well as control plane signals may flow through corresponding constructed service pipelines (e.g., a message pipeline or a control pipeline). Physical deployment of the services in the pipelines may depend on various factors including resource requirements of the services or availability of the network resources. For example, multiple services may be deployed on a single server machine if the multiple services do not consume much computing resources, whereas only one service may be deployed exclusively on a server machine if the service consumes high resources (e.g., a heavy computation service). For example, in the service-oriented network architecture 200, the computing center 220 may comprise the plurality of server machines 230*a*, 230*b*, 230*c*, and 230*d*. The service instances in the pipeline P1 may be deployed to one or more of the server machines with respect to the service types. The system may determine that the service instances M1, M2, and M3 require light computation. If the current available resource of the server machine 230*a* is enough for process the service instances M1, M2, and M3, the service instances M1, M2, and M3 may be deployed to the server machine 230a. If the current available resource of the server machine 230a is not enough for process the service instances M1, M2, and M3, but the server machine 230c is able to process the service instances M1, M2, and M3, the service instances may be deployed to the server machine 230c. Alternatively, the service instances M1, M2, and M3 may be split to different server machines.

In particular embodiments, the capacity of the network may be easily adjusted with respect to network load change. The capacity of the network in the said service-oriented network architecture 200 may be easily scaled up when the network load increases or scaled down when the network load decreases. For example, when the network load is light, there are enough MME services instances available for processing the packets, and only the server machines 230a and 230c may be needed to process the service instances being deployed thereto. When the network load is increased, the system may determine that more MME services are needed for handling the network traffic, or more specifically, more services M1 are needed. Contrary to replication of entire MME in the network entity oriented architecture, the service-oriented network architecture may be able to add only the needed service (e.g., the service M1) for scaling up the network capacity. Depending on the number of the service instances and the server machine capacities, the service instances can be deployed to a number of server machines. For example, the MME service instances may be deployed to a few server machines since they consume less resources, while the SGW service instances may be deployed to a hundred server machines since they involve heavy computation. When the peak hours are passed, or the network load is decreased, the system may determine to scale down the network capacity by reducing the number of the services. The number and types of the service instances can be increased or decreased, and the server machines to be deployed can be reconfigured. In particular embodiments, the changes of the network traffic types may also trigger the network scaling up or down. For example, when the network has hundreds of phone calls but only a few website searching activities, the system may need a lot of MME services but only one SGW/PGW service, wherein the MME and SGW/PGW services may be mixed and running on a few server machines (e.g., the MME services may be deployed to five server machines but the SGW/PGW is deployed to only one server machine). When the system load is changed to a few phone calls but a lot of HULU watching activities, the system may determine to add another SGW or PGW but reduce the number of MME services. The deployments of the services may also be reconfigured, such that the two SGW/PGW services may be deployed to two server machines exclusively, and the MME services may be deployed to one separated server machine. In such a mechanism, the capacity of the network can be easily adjusted dynamically with respect to the network load changes, resulting in an autonomous scalable network. In particular embodiments, the network dimensioning may be manually performed as well.

Ideally, the network dimensioning may be performed during low traffic moment, when the network load is the lightest to minimize the possible impact to the network. Alternatively, the network dimensioning may be performed on the fly with respect to the dynamically changed network load. One of various methods of network dimensioning may be setting up a separate second environment and redirect a portion of the current active services of the first environment to the second environment. The states of the current active services in the first environment can be saved to a cache or any memory storage. When the active services of the first environment are going to be redirected to the second environment, the states of the respective current active services may be copied over to the second environment, and the respective current active services may be run in the second environment based on the recorded states thereof. After the respective current active services are redirected to the second environment, the states of the current active services of the first environment may be deleted. Using this service redirection mechanism, the network capacity can be dynamically scaled up or down by autonomous dimensioning, and the redirection may be atomic to avoid the packets to be split up.

In particular embodiments, new functionalities may be introduced with minimum efforts or cost by using the service-oriented network architecture. For example, the new service 206 is introduced into the network for a new provider or local operator. The service chaining orchestration entity 204 may provide the initial configuration of the new service 206 and reconfigure the service instance immediately in front of the service NEW (e.g., the service PW2). The configuration of the service PW2 may be updated by changing the next phase service type to NEW and setting the corresponding conditions thereof. The service chaining orchestration entity 204 may also update any service configurations that relevant to the new service 206. The service-oriented network architecture 200 may enable multiple network providers or operators to share the same network, such that the multiple providers can access the towers in the same network. Similarly, if a service is no long needed in the network, such that a service needs to be deleted or replaced, the service chaining orchestration entity 204 may update any service configurations that are relevant to the removed or replaced service, specifically the service immediately in front of the deleted or replaced service. Additionally, all the currently active services in the network may write a current service status (e.g., service contexts for each active subscriber, etc.) to a database (e.g., REDIS, which is an open-source in memory database.) For example, the replacement service 208 is used to replace the existing service S2. Before the service S2 is deployed to the respective server machine, the service chaining orchestration entity 204 may reconfigure the service M3, such that the next phase service type of the service M3 is the service S5 instead of the service S2, and the messages may be forwarded to the service S5 instead of the service S2. The service S5 may be configured by the service chaining orchestration entity 204 such that the next phase service type of the service S5 is the service PW1. In the meantime, the service chaining orchestration entity 204 may update any service configurations that are relevant to the service S2 or service S5. In the case that the service S2 is deleted, the service chaining orchestration entity 204 may reconfigure the service M3, such that the service S2 is skipped and the next phase service of the service M3 is the service PW1.

In particular embodiments, the service-oriented architecture may enable the developer to add or update the service functionality independently. For example, the network operator wants to update the policy enforcement service for adding new classification type. A new service may be simply created with a set of new rules or parameters and be configured by the service chaining orchestration entity 204 to replace the existing service for maintenance (e.g., fixing a bug or compile with an updated operating system). This mechanism may bring in more flexibility to easily keep the network optimized and up to date.

Figure 3:
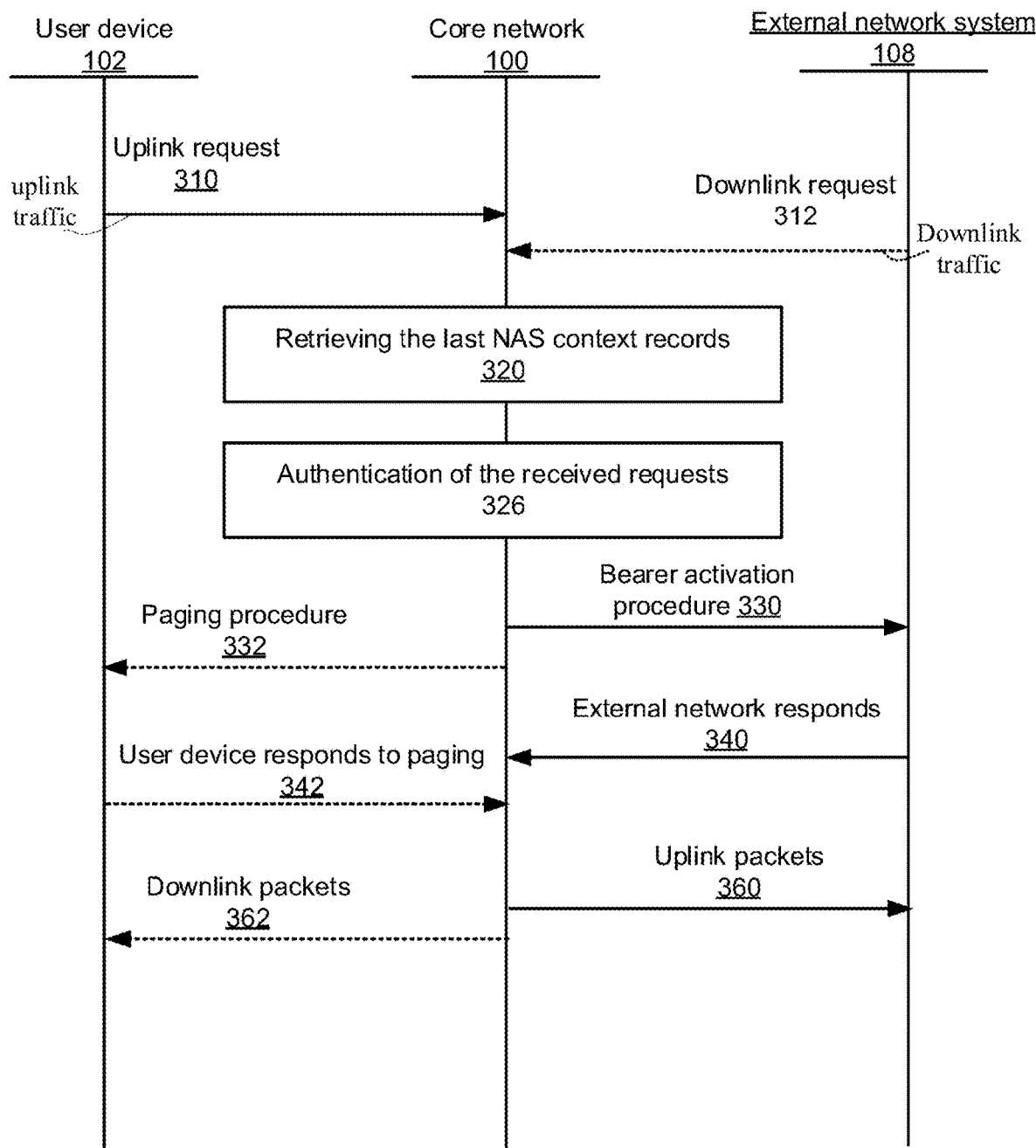
FIG. 3 illustrates an example flowchart of network communication in accordance with particular embodiments.

FIG. 3 illustrates an example flowchart of network communication in accordance with particular embodiments. In the networks, a UE or a user device 102 of FIG. 1 may be connected to the core network 100 via an eNodeB or BTS and then go to IDLE mode (e.g., turning on a smart phone but not using it). When the user device 102 wakes up from the IDLE mode for sending an uplink data to an external network system 108 (e.g., uploading a video to a social networking system), the user device 102 may send a signaling message (e.g., an uplink request 310) to establish a connection to a previously connected MME service instance and perform a process 320 of retrieving the last NAS context records. In the proposed network, although all MME service instances share a single MME identifier, the NAS state may be different since the services might be physically run on different server machines, and the NAS state machine may be changed with respect to where the service last ran. Because the MME configurations have NAS contexts including existing bearers and associated parameters thereof, when receives the signaling message (e.g., the uplink request 310) from the user device 102, the latest configured MME service instance may request services from a directory service for locating the latest NAS context records, wherein the directory service is a distributor service that keeps a list (e.g., a directory D) of active elements on server machines and distribute the NAS state of where the user device 102 was last active. When receives a response from the directory service, the MME service may fetch the latest NAS contexts records with respect to the location information embedded in the directory service response and perform a process 326 of authentication of the received uplink request for the user device 102 with respect to the retrieved latest NAS contexts. If the authentication is successful, a bearer activation procedure 330 may be performed, and the user device 102 may enter a CONNECTED mode for sending the uplink data. Once the user device 102 received an acknowledge 340 from the external network system 108, the uplink packets 360 may be sent to the external network system 108. For example, the network may authenticate whether the user device 102 is a subscriber of the network. If the authentication procedure is successful, such that the user device 102 is authenticated to connect to the network, the bearer activation procedure for the user device 102 may be performed, and the user device 102 may enter a CONNECTED mode for sending the uplink data once the bearer activation is completed. The system may start to deploy the services in the bearer (e.g., the pipeline) to the Cloud computer center, and the uplink data communication may be established.

NAS is a functional layer forming the highest stratum of the control plane between the MME and a user equipment (UE). Main functions of the NAS protocols are the support of mobility of the user equipment (UE) and the support of session management procedures to establish and maintain IP connectivity between the UE and a packet data network gateway (PGW). In particular embodiments, the NAS control protocol may perform functions including bearer management, authentication, activation, paging procedure, or security control, define the rules for a mapping between parameters during inter-system mobility with the respective networks, and also provide the NAS security by integrity protection and ciphering of NAS signaling messages. Additionally, the NAS contexts may contain other information of the last activity of the user device 102, which may include the IP addresses or which eNodeB the user device 102 was active on.

In particular embodiments, the system may identify which towers (e.g., eNodeB or base station) are close to the user device 102, and the topological information of the identified towers may be provided. When a user is approaching to the identified nearby towers, the previous states of the user device that was cached may be pre-populated to the nearby towers. For example, the previous NAS state of the user device 102 was at a tower A, and the previous NAS state of the user device 102 may have been cached. The system may identify that tower B and tower C are nearby the user and pre-populate the recorded NAS state of the user device at the tower A to the identified tower B and tower C. Therefore, when the user device attaches to the tower B or tower C, the NAS state of the user device may have been known, resulting in a reduction of latency.

When a downlink data for the user device 102 arrives at a packets gateway service (PGW) of the core network 100 from the external networking system 108, the PGW may receive a signaling message (e.g., downlink request 312) from the external networking system 108. Typically, the downlink packet may arrive at the PGW service and be forwarded to the SGW service instance. The SGW service instance may perform the process 320 of retrieving the last NAS context records from the directory service for locating the latest NAS contexts records of the user device 102. When receives a response from the directory service, the SGW service may fetch the latest NAS contexts records of the user device 102 with respect to the location information embedded in the directory service response and perform the process 326 of authentication of the received downlink request for the user device 102 with respect to the retrieved latest NAS contexts. If the authentication is successful, a paging procedure 332 may be performed, wherein the paging procedure may wake up the closest eNodeB and the user device 102 for receiving the downlink data. If the closest eNodeB does not response, the paging may be extended to another nearby eNodeB. When a response 342 is received from the user device 102, the downlink packets 362 may be received from the external network system 108 at the user device 102. For example, the network may authenticate whether the user device 102 is a subscriber of the network. If the authentication procedure is successful, such that the user device 102 is authenticated to connect to the network, the paging procedure for the user device 102 may be performed, and the user device 102 may enter a CONNECTED mode for receiving the downlink data once the paging procedure is completed, and the downlink data communication may be established. In particular embodiments, the downlink packet may be forwarded to the last gateway the user device 102 was served, and then the downlinked packet may be tunnel forwarded to the new location (e.g., new eNodeB), wherein the new location may start the paging procedure.

Figure 4:
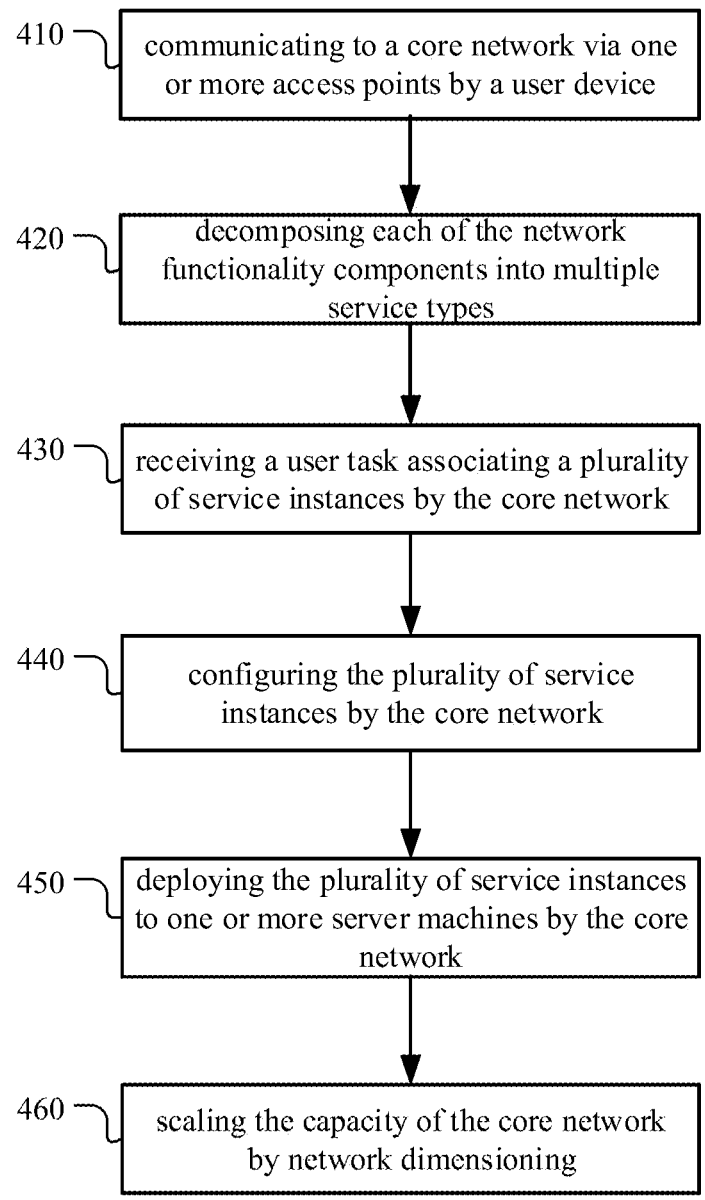
FIG. 4 illustrates an example method 400 for deploying network functionalities.

FIG. 4 illustrates an example method 400 for deploying network functionalities. The method may begin at step 410, where a user equipment (UE) or a user device may access a network (e.g., a core network) by via an access points (e.g., an eNodeB), wherein the network comprises one or more network functionality components. At step 420, each of the one or more network functionality components may be decomposed into multiple services types. At step 430, receiving one or more user tasks, wherein a plurality of service instances may be associated with each of the one or more user tasks, wherein one or more of the plurality of service instances belong to one of the multiple decomposed service types. At step 440, the plurality of service instances may be configured by a service chaining orchestration entity of the core network. At step 450, the plurality of service instances may be deployed to one or more server machines of the core network with respect to the configurations of the plurality of service instances by the service chaining orchestration entity of the core network. At step 460, the capacity of the network may be scaled up or down by network dimensioning. Particular embodiments may repeat one or more steps of the method of FIG. 4, where appropriate. Although this disclosure describes and illustrates particular steps of the method of FIG. 4 as occurring in a particular order, this disclosure contemplates any suitable steps of the method of FIG. 4 occurring in any suitable order. Moreover, although this disclosure describes and illustrates an example method for deploying network functionalities including the particular steps of the method of FIG. 4, this disclosure contemplates any suitable method for wireless communication including any suitable steps, which may include all, some, or none of the steps of the method of FIG. 4, where appropriate. Furthermore, although this disclosure describes and illustrates particular components, devices, or systems carrying out particular steps of the method of FIG. 4, this disclosure contemplates any suitable combination of any suitable components, devices, or systems carrying out any suitable steps of the method of FIG. 4.

Figure 5:
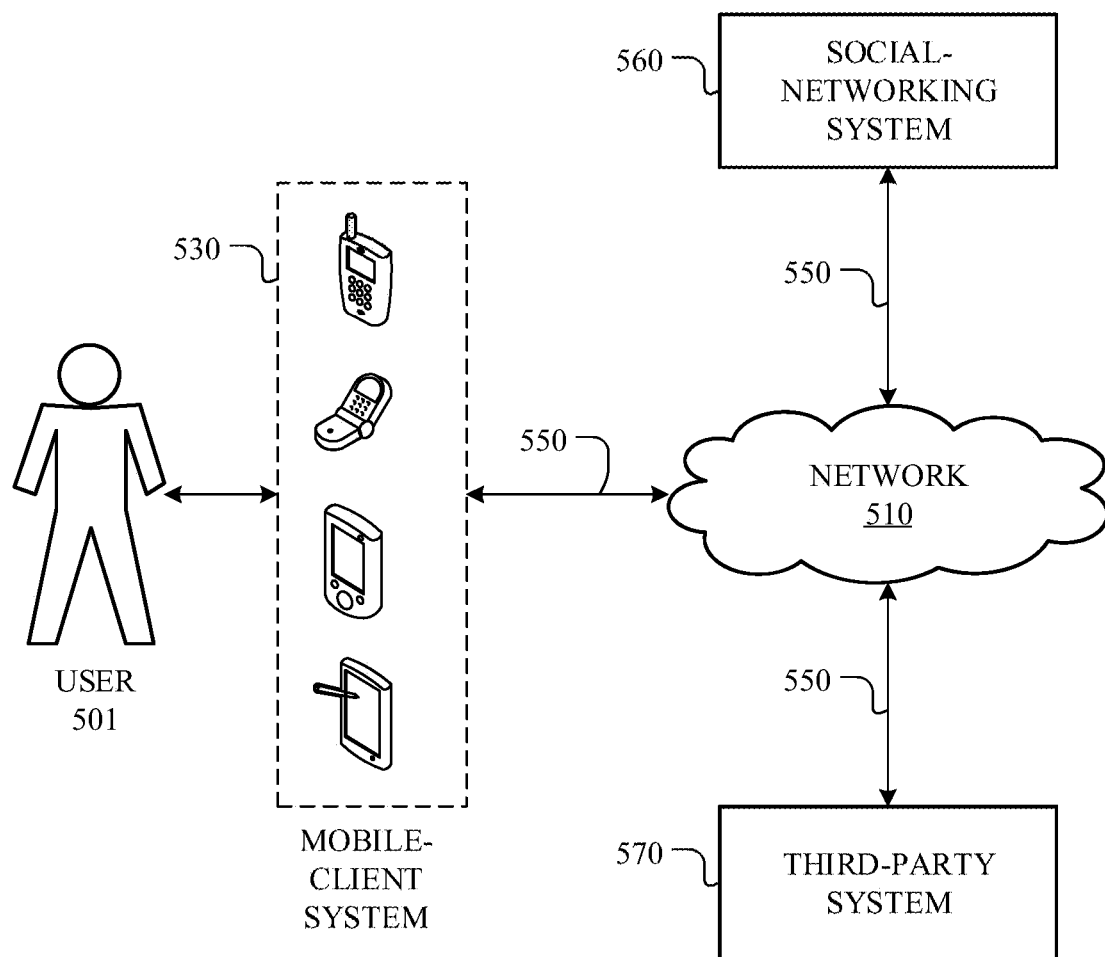
FIG. 5 illustrates an example network environment associated with a social-networking system.

FIG. 5 illustrates an example network environment 500 associated with a social-networking system. Network environment 500 includes a user 501, a client system 530, a social-networking system 560, and a third-party system 570 connected to each other by a network 510. Although FIG. 5 illustrates a particular arrangement of user 501, client system 530, social-networking system 560, third-party system 570, and network 510, this disclosure contemplates any suitable arrangement of user 501, client system 530, social-networking system 560, third-party system 570, and network 510. As an example and not by way of limitation, two or more of client system 530, social-networking system 560, and third-party system 570 may be connected to each other directly, bypassing network 510. As another example, two or more of client system 530, social-networking system 560, and third-party system 570 may be physically or logically co-located with each other in whole or in part. Moreover, although FIG. 5 illustrates a particular number of users 501, client systems 530, social-networking systems 560, third-party systems 570, and networks 510, this disclosure contemplates any suitable number of users 501, client systems 530, social-networking systems 560, third-party systems 570, and networks 510. As an example and not by way of limitation, network environment 500 may include multiple users 501, client system 530, social-networking systems 560, third-party systems 570, and networks 510.

In particular embodiments, user 501 may be an individual (human user), an entity (e.g., an enterprise, business, or third-party application), or a group (e.g., of individuals or entities) that interacts or communicates with or over social-networking system 560. In particular embodiments, social-networking system 560 may be a network-addressable computing system hosting an online social network. Social-networking system 560 may generate, store, receive, and send social-networking data, such as, for example, user-profile data, concept-profile data, social-graph information, or other suitable data related to the online social network. Social-networking system 560 may be accessed by the other components of network environment 500 either directly or via network 510. In particular embodiments, social-networking system 560 may include an authorization server (or other suitable component(s)) that allows users 501 to opt in to or opt out of having their actions logged by social-networking system 560 or shared with other systems (e.g., third-party systems 570), for example, by setting appropriate privacy settings. A privacy setting of a user may determine what information associated with the user may be logged, how information associated with the user may be logged, when information associated with the user may be logged, who may log information associated with the user, whom information associated with the user may be shared with, and for what purposes information associated with the user may be logged or shared. Authorization servers may be used to enforce one or more privacy settings of the users of social-networking system 30 through blocking, data hashing, anonymization, or other suitable techniques as appropriate. In particular embodiments, third-party system 570 may be a network-addressable computing system that can host network communication. Third-party system 570 may generate, store, receive, and send uplink data or downlink data, such as, for example, network command, data packages, user requests, and/or network configuration information. Third-party system 570 may be accessed by the other components of network environment 500 either directly or via network 510. In particular embodiments, one or more users 501 may use one or more client systems 530 to access, send data to, and receive data from social-networking system 560 or third-party system 570. Client system 530 may access social-networking system 560 or third-party system 570 directly, via network 510, or via a third-party system. As an example and not by way of limitation, client system 530 may access third-party system 570 via social-networking system 560. Client system 530 may be any suitable computing device, such as, for example, a personal computer, a laptop computer, a cellular telephone, a smartphone, a tablet computer, or an augmented/virtual reality device.

This disclosure contemplates any suitable network 510. As an example and not by way of limitation, one or more portions of network 510 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 510 may include one or more networks 510.

Links 550 may connect client system 530, social-networking system 560, and third-party system 570 to communication network 510 or to each other. This disclosure contemplates any suitable links 550. In particular embodiments, one or more links 550 include one or more wireline (such as for example Digital Subscriber Line (DSL) or Data Over Cable Service Interface Specification (DOC SIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 550 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 550, or a combination of two or more such links 550. Links 550 need not necessarily be the same throughout network environment 500. One or more first links 550 may differ in one or more respects from one or more second links 550.

Figure 6:
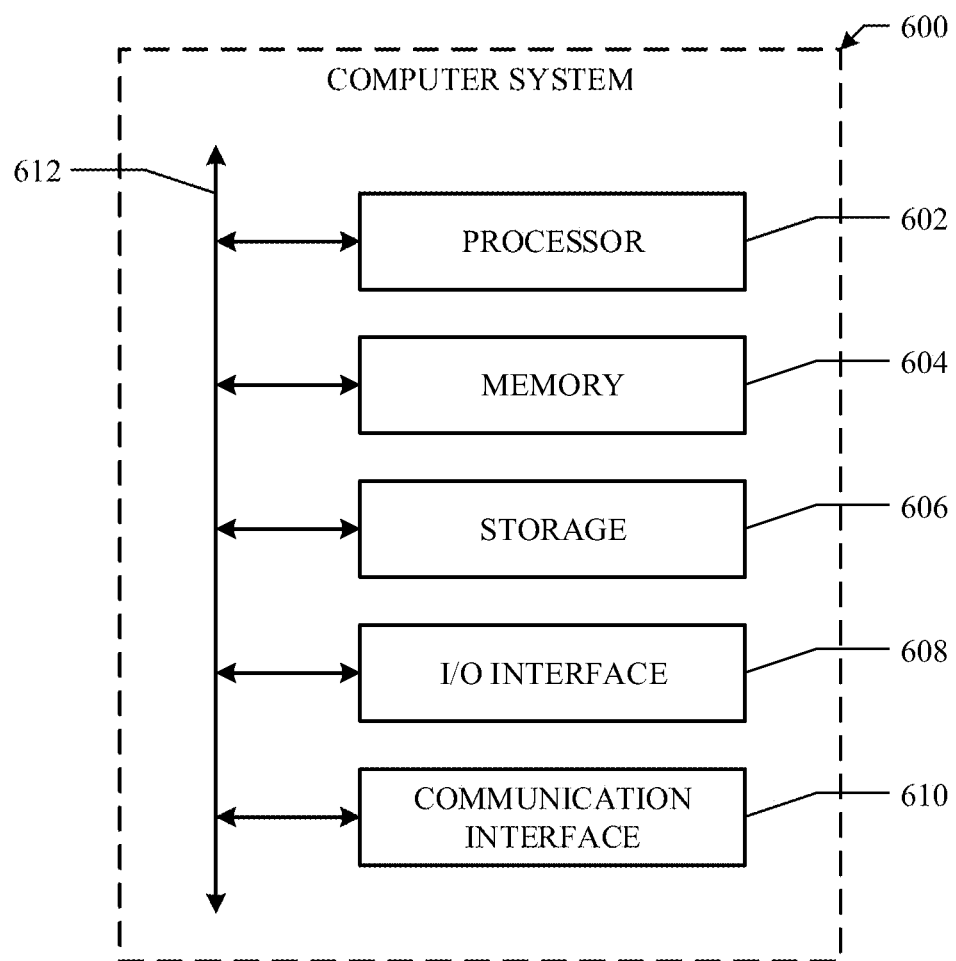
FIG. 6 illustrates an example computer system.

FIG. 6 illustrates an example computer system 600. In particular embodiments, one or more computer systems 600 perform one or more steps of one or more methods described or illustrated herein. In particular embodiments, one or more computer systems 600 provide functionality described or illustrated herein. In particular embodiments, software running on one or more computer systems 600 performs one or more steps of one or more methods described or illustrated herein or provides functionality described or illustrated herein. Particular embodiments include one or more portions of one or more computer systems 600. Herein, reference to a computer system may encompass a computing device, and vice versa, where appropriate. Moreover, reference to a computer system may encompass one or more computer systems, where appropriate.

This disclosure contemplates any suitable number of computer systems 600. This disclosure contemplates computer system 600 taking any suitable physical form. As example and not by way of limitation, computer system 600 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 600 may include one or more computer systems 600; be unitary or distributed; span multiple locations; span multiple machines; span multiple data centers; or reside in a Cloud, which may include one or more Cloud components in one or more networks. Where appropriate, one or more computer systems 600 may perform without substantial spatial or temporal limitation one or more steps of one or more methods described or illustrated herein. As an example and not by way of limitation, one or more computer systems 600 may perform in real time or in batch mode one or more steps of one or more methods described or illustrated herein. One or more computer systems 600 may perform at different times or at different locations one or more steps of one or more methods described or illustrated herein, where appropriate.

In particular embodiments, computer system 600 includes a processor 602, memory 604, storage 606, an input/output (I/O) interface 608, a communication interface 610, and a bus 612. Although this disclosure describes and illustrates a particular computer system having a particular number of particular components in a particular arrangement, this disclosure contemplates any suitable computer system having any suitable number of any suitable components in any suitable arrangement.

In particular embodiments, processor 602 includes hardware for executing instructions, such as those making up a computer program. As an example and not by way of limitation, to execute instructions, processor 602 may retrieve (or fetch) the instructions from an internal register, an internal cache, memory 604, or storage 606; decode and execute them; and then write one or more results to an internal register, an internal cache, memory 604, or storage 606. In particular embodiments, processor 602 may include one or more internal caches for data, instructions, or addresses. This disclosure contemplates processor 602 including any suitable number of any suitable internal caches, where appropriate. As an example and not by way of limitation, processor 602 may include one or more instruction caches, one or more data caches, and one or more translation lookaside buffers (TLBs). Instructions in the instruction caches may be copies of instructions in memory 604 or storage 606, and the instruction caches may speed up retrieval of those instructions by processor 602. Data in the data caches may be copies of data in memory 604 or storage 606 for instructions executing at processor 602 to operate on; the results of previous instructions executed at processor 602 for access by subsequent instructions executing at processor 602 or for writing to memory 604 or storage 606; or other suitable data. The data caches may speed up read or write operations by processor 602. The TLBs may speed up virtual-address translation for processor 602. In particular embodiments, processor 602 may include one or more internal registers for data, instructions, or addresses. This disclosure contemplates processor 602 including any suitable number of any suitable internal registers, where appropriate. Where appropriate, processor 602 may include one or more arithmetic logic units (ALUs); be a multi-core processor; or include one or more processors 602. Although this disclosure describes and illustrates a particular processor, this disclosure contemplates any suitable processor.

In particular embodiments, memory 604 includes main memory for storing instructions for processor 602 to execute or data for processor 602 to operate on. As an example and not by way of limitation, computer system 600 may load instructions from storage 606 or another source (such as, for example, another computer system 600) to memory 604. Processor 602 may then load the instructions from memory 604 to an internal register or internal cache. To execute the instructions, processor 602 may retrieve the instructions from the internal register or internal cache and decode them. During or after execution of the instructions, processor 602 may write one or more results (which may be intermediate or final results) to the internal register or internal cache. Processor 602 may then write one or more of those results to memory 604. In particular embodiments, processor 602 executes only instructions in one or more internal registers or internal caches or in memory 604 (as opposed to storage 606 or elsewhere) and operates only on data in one or more internal registers or internal caches or in memory 604 (as opposed to storage 606 or elsewhere). One or more memory buses (which may each include an address bus and a data bus) may couple processor 602 to memory 604. Bus 612 may include one or more memory buses, as described below. In particular embodiments, one or more memory management units (MMUs) reside between processor 602 and memory 604 and facilitate accesses to memory 604 requested by processor 602. In particular embodiments, memory 604 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 604 may include one or more memories 604, where appropriate. Although this disclosure describes and illustrates particular memory, this disclosure contemplates any suitable memory.

In particular embodiments, storage 606 includes mass storage for data or instructions. As an example and not by way of limitation, storage 606 may include a hard disk drive (HDD), a floppy disk drive, flash memory, an optical disc, a magneto-optical disc, magnetic tape, or a Universal Serial Bus (USB) drive or a combination of two or more of these. Storage 606 may include removable or non-removable (or fixed) media, where appropriate. Storage 606 may be internal or external to computer system 600, where appropriate. In particular embodiments, storage 606 is non-volatile, solid-state memory. In particular embodiments, storage 606 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 606 taking any suitable physical form. Storage 606 may include one or more storage control units facilitating communication between processor 602 and storage 606, where appropriate. Where appropriate, storage 606 may include one or more storages 606. Although this disclosure describes and illustrates particular storage, this disclosure contemplates any suitable storage.

In particular embodiments, I/O interface 608 includes hardware, software, or both, providing one or more interfaces for communication between computer system 600 and one or more I/O devices. Computer system 600 may include one or more of these I/O devices, where appropriate. One or more of these I/O devices may enable communication between a person and computer system 600. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 608 for them. Where appropriate, I/O interface 608 may include one or more device or software drivers enabling processor 602 to drive one or more of these I/O devices. I/O interface 608 may include one or more I/O interfaces 608, where appropriate. Although this disclosure describes and illustrates a particular I/O interface, this disclosure contemplates any suitable I/O interface.

In particular embodiments, communication interface 610 includes hardware, software, or both providing one or more interfaces for communication (such as, for example, packet-based communication) between computer system 600 and one or more other computer systems 600 or one or more networks. As an example and not by way of limitation, communication interface 610 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 610 for it. As an example and not by way of limitation, computer system 600 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 600 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 600 may include any suitable communication interface 610 for any of these networks, where appropriate. Communication interface 610 may include one or more communication interfaces 610, where appropriate. Although this disclosure describes and illustrates a particular communication interface, this disclosure contemplates any suitable communication interface.

In particular embodiments, bus 612 includes hardware, software, or both coupling components of computer system 600 to each other. As an example and not by way of limitation, bus 612 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 612 may include one or more buses 612, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising:
receiving, by a core network, from a user device via an access point, a request to perform a task, wherein the core network comprises one or more network functionality components, wherein each of the one or more network functionality components is decomposed into multiple service types;
identifying, by the core network, a plurality of service instances for deployment to accomplish the task, wherein each of the plurality of service instances belongs to one of the multiple decomposed service types; and
deploying, by the core network, the plurality of service instances to one or more server machines of the core network according to a schedule based on resource requirements of the service instances and current resource availability of the one or more server machines.

2. The method of claim 1, further comprising:
forming one or more pipelines, wherein the one or more pipelines comprise the sequence of the plurality of service instances.

3. The method of claim 2, further comprising:
hashing one or more fields of an encapsulation header of an encapsulation protocol for determining which of the one or more server machines are deployed.

4. The method of claim 2, further comprising forming a message pipeline.

5. The method of claim 1, wherein the one or more network functionality components are decomposed into multiple service types by a service-oriented decomposing.

6. The method of claim 1, further comprising:
scheduling, by the core network, the plurality of service instances for deployment to accomplish the task.

7. The method of claim 6, further comprising rescheduling the plurality of service instances.

8. The method of claim 1, further comprising:
updating one or more of the multiple decomposed service types or adding one or more new service types.

9. The method of claim 1, further comprising:
scaling a capacity of the core network by network dimensioning, wherein the network dimensioning includes dynamically adjusting a number of the plurality of service instances or consolidating the servicer machines being deployed with respect to a network load.

10. The method of claim 1, wherein the decomposing each of the one or more functionality components include decomposing functionality components of at least a Mobility Management Entity (MME), a Service Gateway (SGW), or a Packet Gateway (PGW).

11. One or more computer-readable non-transitory storage media embodying software that is operable when executed to:
receive, by a core network, from a user device via an access point, a request to perform a task, wherein the core network comprises one or more network functionality components, wherein each of the one or more network functionality components is decomposed into multiple service types;
identify, by the core network, a plurality of service instances for deployment to accomplish the task, wherein each of the plurality of service instances belongs to one of the multiple decomposed service types; and
deploy, by the core network, the plurality of service instances to one or more server machines of the core network according to a schedule based on resource requirements of the service instances and current resource availability of the one or more server machines.

12. The media of claim 11, wherein the software is further operable when executed to:
form one or more pipelines, wherein the one or more pipelines comprise the sequence of the plurality of service instances.

13. The media of claim 12, wherein the software is further operable when executed to:
hash one or more fields of an encapsulation header of an encapsulation protocol for determining which of the one or more server machines are deployed.

14. The media of claim 12, wherein the software is further operable when executed to form a message pipeline.

15. The media of claim 11, wherein the one or more network functionality components are decomposed into multiple service types by a service-oriented decomposing.

16. The media of claim 11, wherein the software is further operable when executed to:
schedule, by the core network, the plurality of service instances for deployment to accomplish the task.

17. The media of claim 16, wherein the software is further operable when executed to reschedule the plurality of service instances.

18. The media of claim 11, wherein the software is further operable when executed to:
update one or more of the multiple decomposed service types or adding one or more new service types.

19. The media of claim 11, wherein the software is further operable when executed to:
scale a capacity of the core network by network dimensioning, wherein the network dimensioning includes dynamically adjusting a number of the plurality of service instances or consolidating the servicer machines being deployed with respect to a network load.

20. A system comprising: one or more processors; and a memory coupled to the processors comprising instructions executable by the processors, the processors being operable when executing the instructions to:
receive, by a core network, from a user device via an access point, a request to perform a task, wherein the core network comprises one or more network functionality components, wherein each of the one or more network functionality components is decomposed into multiple service types;
identify, by the core network, a plurality of service instances for deployment to accomplish the task, wherein each of the plurality of service instances belongs to one of the multiple decomposed service types; and
deploy, by the core network, the plurality of service instances to one or more server machines of the core network according to a schedule based on resource requirements of the service instances and current resource availability of the one or more server machines.

* * * * *